R. P. JACKSON.
SYSTEM OF CONTROL FOR ALTERNATING DIRECT CURRENT MOTORS.
APPLICATION FILED DEC. 18, 1905.

967,386.

Patented Aug. 16, 1910.
2 SHEETS—SHEET 1.

WITNESSES:
C. L. Belcher
Otto S. Schauer

INVENTOR
Ray P. Jackson
BY
Wesley G. Carr
ATTORNEY

UNITED STATES PATENT OFFICE.

RAY P. JACKSON, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL FOR ALTERNATING-DIRECT-CURRENT MOTORS.

967,386.   Specification of Letters Patent.   Patented Aug. 16, 1910.

Application filed December 18, 1905. Serial No. 292,234.

*To all whom it may concern:*

Be it known that I, RAY P. JACKSON, a citizen of the United States, and a resident of Wilkinsburg, in the county of Allegheny and State of Pennsylvania, have invented a new and useful Improvement in Systems of Control for Alternating-Direct-Current Motors, of which the following is a specification.

My invention relates to systems of control for electric motors or other translating devices that are adapted to be operated by either alternating or direct current.

The object of my invention is to provide a novel and improved means whereby the circuits of the motors or other translating devices may be arranged automatically and be subsequently governed in accordance with the character and voltage of the energy that may be supplied thereto.

Since the development of the commutator type of alternating current motor, which may also be operated satisfactorily by direct current, it has been found desirable to equip electrical railway vehicles therewith, and particularly such vehicles as are employed in interurban service, in order that the vehicles may be operated in cities and towns upon the existing direct current systems and by alternating current in rural districts where it is desirable to secure greater efficiency in longer distances of transmission by the use of high voltages. Alternating current may also be transformed efficiently from one voltage to another by means of very simple and comparatively inexpensive apparatus and may consequently be transmitted over a railway system at a high voltage and be utilized by motors at a low voltage, while the means for effecting transformation of direct current are complicated and expensive and can be utilized only when the difference in voltage is small, so that it is usually applied to the motors at the transmission voltage. It has generally been found most expedient to arrange the motors in different circuit relations when operating by alternating current than when operating by direct current; for instance, when a vehicle is provided with four motors, they may be connected in series-parallel relation when operating by alternating current and in series relation when operating by direct current.

It is one of the objects of my invention to provide means whereby the adjustment of the circuit relations of the motors may be effected automatically in accordance with the character of the energy supplied thereto.

In two other applications, Serial Numbers 292,235 and 292,236, respectively, filed by me of even date herewith, I have described and claimed means whereby the circuit relations of the motors may be adjusted in accordance with the character of energy that may be supplied thereto, which operate upon or are located directly in the circuits of the motors themselves, but according to my present invention, the circuit relations of the motors are governed by means which operate upon or are located in the auxiliary or control circuits of the system. The present invention differs also from those referred to in a manner which will be hereinafter more fully set forth.

My invention also provides means whereby the auxiliary or control circuits of the system may be supplied automatically with the same character of energy as that derived from the distributing circuit.

It is frequently found desirable to supply energy at different voltages to various portions of a railway system; for instance, in cities and towns, it may be required by ordinances or otherwise to operate at a lower voltage than it is most expedient to employ in rural districts for the greater distances of transmission. It is consequently desirable to provide a system whereby the motors may be operated efficiently regardless of the voltage that may be derived from the distributing system, such a system being provided by my present invention.

Figure 1:
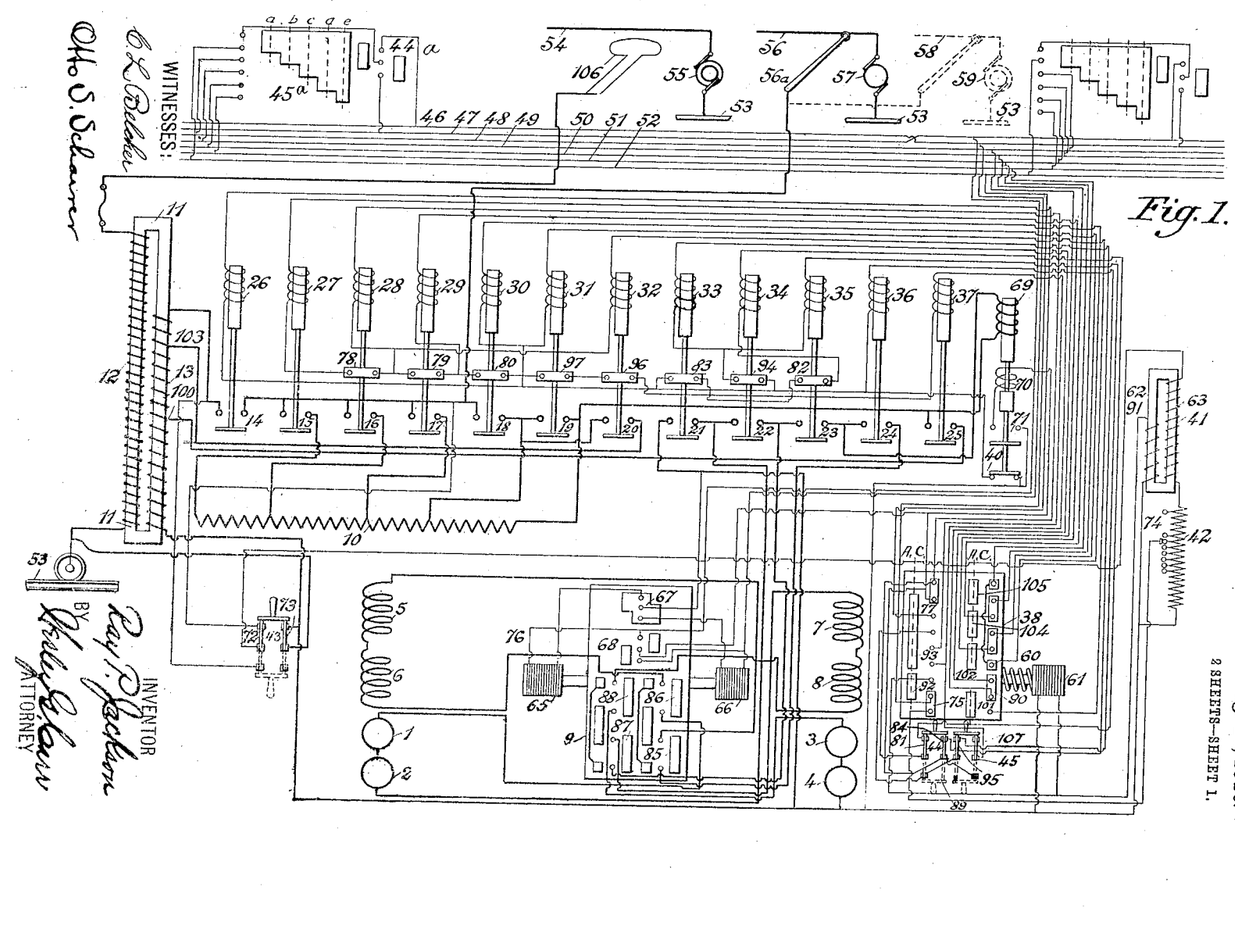
Figure 1 of the accompanying drawings illustrates, diagrammatically, a system of control that embodies my invention.

The system comprises, among its important elements, four motors having armatures 1, 2, 3 and 4, respectively, and field magnet windings 5, 6, 7 and 8, respectively; a reversing switch 9 whereby the circuits of the motors may be adjusted respectively for forward and reverse rotation; a resistance 10; a main transformer 11 having primary and secondary windings 12 and 13, respectively; a plurality of switches 14, 15, 16, 17, 18, 19, 20, 21, 22, 23, 24 and 25, whereby the circuit relations of the motors are adjusted and the amount of the resistance 10 or the active length of the secondary winding 13 of the transformer 11 that is included in the motor circuits may be adjusted; magnet windings 26, 27, 28, 29, 30, 31, 32, 33, 34, 35, 36 and 37, whereby the operations of the switches 14 to 25, inclusive, may be governed; a change-over switch 38 for controlling the circuits of the magnet windings 26 to 37, inclusive, for the purpose of adjusting the circuits of the motors for operation by either direct or alternating current; an overload relay switch 40, which opens the circuits of the magnet windings 26 to 37, inclusive, and thereby causes the motor circuits to be opened, when more than a predetermined amount of current is supplied to the motors; an auxiliary transformer 41 and an auxiliary resistance 42 by means of which the control circuits of the system may be supplied with the same character of energy as that supplied to the motors; a switch 43 that is operated when making a change from one voltage to another when operating by alternating current; cut-out switches 44 and 45 that are located in the circuits of certain of the magnet windings 26 to 37, inclusive, and that modify the order of closure of the switches 14 to 25, inclusive, so as to prevent inclusion in the main circuit of one or the other of the pairs of motors; a master switch 44ª whereby the operation of the reversing switch 9 may be governed; a master switch 45ª whereby the circuits of the magnet windings 26 to 37, inclusive, may be controlled; train conductors 46, 47, 48, 49, 50, 51 and 52, that may extend from car to car of a train comprising a plurality of vehicles each of which may be equipped with the system here shown, whereby the several systems may be controlled in parallel circuit; a track rail or grounded return conductor 53; a trolley conductor 54 that is supplied with high voltage alternating current energy from any suitable source, such as that shown at 55; a trolley conductor 56 that is supplied with direct current from any suitable source, such as that shown at 57, and a trolley conductor 58 that is supplied with low voltage alternating current from any suitable source, such as that shown at 59.

A spring 60 maintains the change-over switch 38 normally in the position shown, which thereby arranges the circuits of the magnet windings 26 to 37, inclusive, in a manner such that the motor circuits may be arranged by the switches 14 to 25, inclusive, for direct current operation. The circuits of the magnet windings 26 to 37, inclusive, are arranged so as to enable the switches 14 to 25, inclusive, to arrange the circuits of the motors for alternating current operation when the change-over switch 38 is caused, by means of a magnet winding 61, to occupy such a position that the conducting segments on the dotted line A—C engage the corresponding contact terminals. The magnet winding 61 is connected directly in circuit with secondary winding 62 of the auxiliary transformer 41 and is energized only when alternating current is supplied to primary winding 63, the ohmic resistance of which is low as compared with that of the device 42.

The reversing switch 9 is adapted to occupy positions for arranging the motor circuits for forward and reverse rotation, respectively, and is caused to be moved from one position to the other by means of magnet windings 65 and 66, the circuits of which are controlled directly by means of the master switch 44ª and also by means of an interlocking switch 67 that is operated by the reversing switch. The interlocking switch serves to open the circuit of the magnet winding which has caused operation of the reversing switch as soon as the operation is completed, in order to prevent waste of energy in the winding and heating thereof. An interlocking switch 68, which is also operated by the reversing switch, serves to prevent energizing of the magnet windings 26 to 37, inclusive, of the switches 14 to 25, inclusive, until the reversing switch has been moved to either its forward or reverse position.

The overload relay switch 40 is provided with an operating magnet winding 69 that is connected in series with the motors and that is sufficiently energized to cause opening of the switch 40 only when more than a predetermined amount of current traverses the motor circuits. It is also provided with a magnet winding 70, the circuit of which is closed by means of an interlocking switch 71 upon opening of the overload relay switch 40 and that then serves to retain the relay switch in an open position until the master switch 45 has been returned to its "off" position. The remainder of the operation of the system may be best understood by tracing certain of the circuits in detail as they are established in practice.

Figure 2:
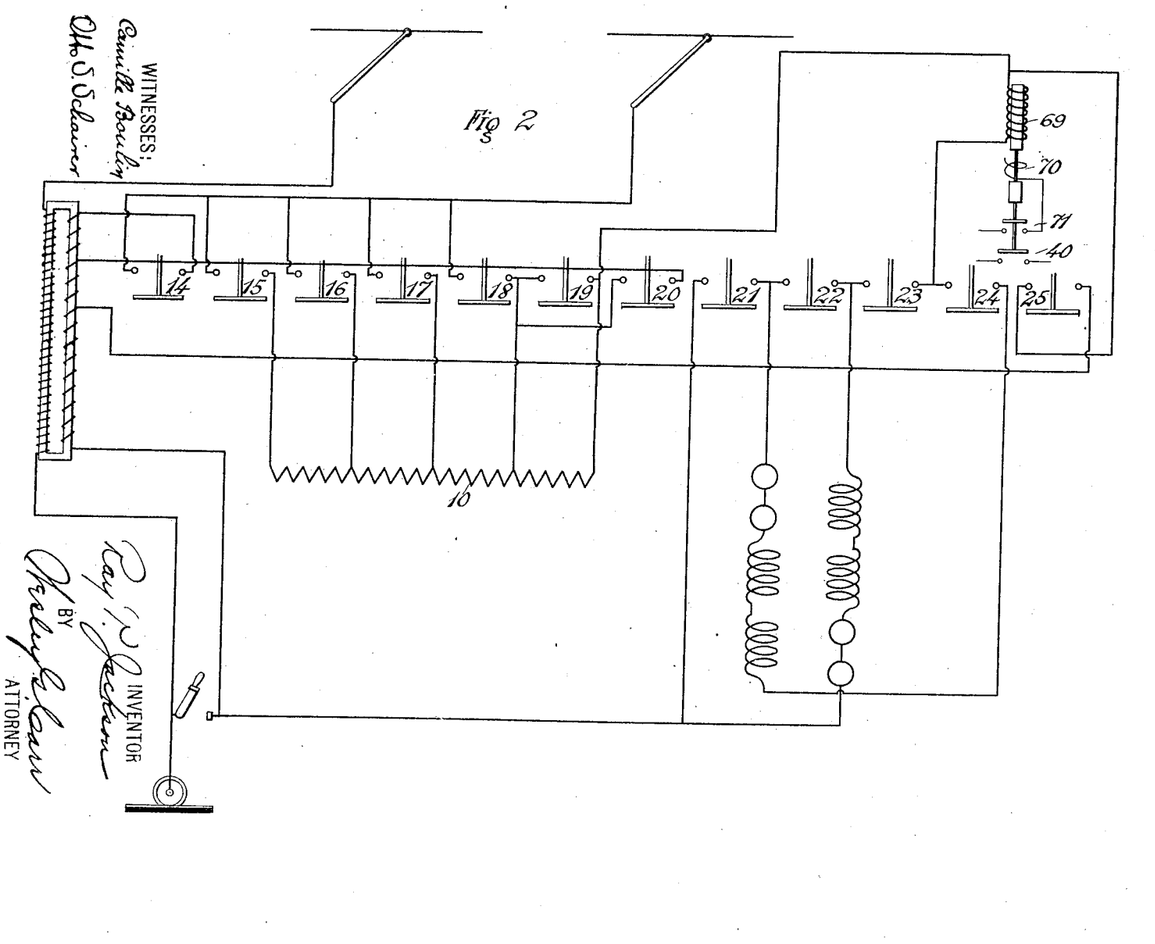
Fig. 2 is a simplified diagram by means of which the operation of the system shown in Fig. 1 may be more readily understood.

When a trolley collector 56ª engages conductor 56, the system is supplied with direct current through blade 72 of the switch 43, primary winding 63 of the transformer 41, auxiliary resistance 42, blade 73 of the switch 43, to the track rail 53. Then if the master switch 44ª is moved to the left and the master switch 45ª to position a, a circuit will be established from a suitable point 74 in the auxiliary resistance 42, through conducting segment 75 of the change-over switch 38, master switches 45ª and 44ª, train conductor 47, magnet winding 65 of the reversing switch, interlocking switch 67 and blade 73 of the switch 43, to the track rail 53. The magnet winding 65 is then arranged in a shunt circuit to a portion of the auxiliary resistance 42 and the voltage impressed upon it will be nearly equal to the drop of potential which would exist between the point 74 in the resistance 42 and its grounded terminal if no such shunt circuit were established, providing the amount of current that traverses the shunt circuit is small as compared with that which traverses the resistance 42, as will be readily understood by those skilled in the art. The circuit of the winding 65 is interrupted immediately after the reversing switch is moved to the corresponding position by means of the interlocking switch 67, and the interlocking switch 68, which is also operated by the reversing switch, establishes or continues a circuit from the terminal 76 of the magnet winding 65, through the interlocking switch 68, to the conducting segment 77 of the change-over switch, where the circuit divides into three portions, one of which traverses magnet winding 27, interlocking switches 78, 79 and 80 that are operated respectively by the switches 16, 17 and 18, overload relay switch 40 and the blade 73 of the switch 43 in the full line position, to the track rail 53. Another portion of the circuit traverses blade 81 of the cut-out switch 44, magnet winding 34, interlocking switches 82 and 83 that are operated respectively by the switches 23 and 21, overload relay switch 40 in the usual manner, to ground, and the third portion traverses blade 84 of the cut-out switch 44, magnet winding 36 of the switch 24, overload relay switch 40 and in the usual manner to ground. The magnet windings 27, 34 and 36 are then supplied with energy from a circuit in shunt to a portion of the auxiliary resistance 42, in a manner similar to that in which the magnet winding 65 of the reversing switch was supplied, and the corresponding switches 15, 22 and 24 are closed. A circuit is then established from the trolley conductor 56, through switch 15, resistance 10, operating magnet winding 69 of the overload relay switch, switch 24, conducting segment 85 of the reversing switch 9, field magnet windings 5 and 6, conducting segment 86 of the reversing switch, motor armatures 1 and 2, switch 22, conducting segment 87 of the reversing switch, field magnet windings 7 and 8, conducting segment 88 of the reversing switch, motor armatures 3 and 4 and blade 73 of the switch 43, to the track rail 53. The motors are then connected in series with all of the resistance 10 in circuit, the conditions of the circuit being best understood from a consideration of the diagram of Fig. 2. If the master switch 45ª is moved to the position b, another circuit is established from a point 74 in the auxiliary resistance 42, through conducting segment 75 of the change-over switch, master switch 43, train conductor 48, conducting segment 90 of the change-over switch, magnet winding 28 of the switch 16, interlocking switches 79 and 80 and by way of the usual circuit through the overload relay switch 40 to the track rail 53. The magnet winding 28 is then energized and the switch 16 is closed, thereby removing a portion of the resistance 10 from the circuit. Closing of the switch 16 also effects opening of the interlocking switch 78 and interruption of the circuit of the magnet winding 27, the switch 15 being thereby permitted to open. As the master switch 45ª is moved through its succeeding positions c, d and e, the magnet windings 29, 30 and 31, respectively, of the switches 17, 18 and 19 will be established and the corresponding switches closed, thereby removing the remainder of the resistance 10 from the motor circuits, each of the switches opening as the succeeding one is closed, except that switch 18 remains closed after closure of switch 19, so that when the master switch occupies position e, only switches 18, 19, 22 and 24 remain closed.

When a vehicle that is equipped with my system is operated upon a section of the railway that is supplied with low voltage alternating current, a circuit is established from the trolley conductor 58, through the broken line portion of the circuit, blade 72 of the switch 73 in the position shown in full lines, primary winding 63 of the transformer 41, auxiliary resistance 42 and blade 73 of the switch 43, to the ground at 53. The secondary winding 62 of the transformer and the magnet winding 61 of the change-over switch are then energized and the change-over switch is moved so as to bring the segments upon the broken lines A—C into engagement with the corresponding contact fingers for the purpose of enabling the arrangement of the circuits of the motors for operation by alternating current. Then, if the master switch 44ª is moved to the left and the master switch 45ª occupies the position a, a circuit is established from terminal 91 of secondary winding 62, through conducting segment 92 of the change-over switch, train conductor 52, master switches 45ª and 44ª, train conductor 47, magnet winding 65 of the reversing switch, interlocking switch 67, blade 73 of the switch 43, to the track rail 53. The reversing switch will then be operated in a manner which has been described hereinbefore, and the interlocking switch 68 will also be operated so as to establish or to continue a circuit therefrom to conducting segment 93 of the change-over switch, where the circuit divides, one portion traversing magnet winding 26 of the switch 14, overload relay switch 40, the blade 73 of the switch 43, to the ground at 53. Another circuit is established through magnet winding 33 of the switch 21, interlocking switch 94, that is operated by the switch 22, and by way of the overload relay switch 40 and the usual circuit to the track rail 53; another circuit is established through the blade 95 of the cut-out switch 45, magnet winding 35 of the switch 23, interlocking switch 94 and by way of the usual circuit, to ground; a fourth circuit traverses the blade 84 of the cut-out switch 44, magnet winding 36 and overload relay switch 40, to the ground in the usual manner, and the remaining circuit is established through magnet winding 37 of the switch 25, interlocking switches 96 and 97 that are operated respectively by switches 20 and 19, and by way of the usual circuit, to the ground. Magnet windings 26, 33, 35, 36 and 37 are then energized and the corresponding switches 14, 21, 23, 24 and 25, respectively, are closed. A circuit is then established from the trolley conductor 58, through the switch 14, secondary winding 13 of the transformer 11, to the ground by way of the usual circuit, the secondary winding 13 being in this case—that is, when low voltage alternating current is supplied to the system—utilized as an auto-transformer winding. Another circuit is established from a point 100 in the transformer winding 13, through switch 25, magnet winding 69 of the overload relay switch 40, where the circuit divides, one portion traversing switch 23, conducting segment 87, field magnet windings 7 and 8, conducting segment 88, armatures 3 and 4, and by way of the usual circuit, to ground, and the other portion traversing switch 24, conducting segment 85 of the reversing switch, field magnet windings 5 and 6, conducting segment 86, armatures 1 and 2, and switch 21, by way of the usual circuit, to ground. The motors are then connected in series parallel relation, as may be best understood by referring to Fig. 2. If the master switch is moved to position b, another circuit is established from the terminal 91 of the transformer winding 61, through conducting segment 92 of the change-over switch, train conductor 52, master switch 45ª, train conductor 48, conducting segment 101 of the change-over switch, magnet winding 32 of the switch 20, interlocking switches 79 and 80, and by way of the overload relay switch 40 to ground. Closing of the switch 20 opens interlocking switch 96 and interrupts the circuit of the magnet winding 37, enabling the switch 25 to open. The motors are then connected in series-parallel relation between the point 103 in the transformer winding 13 and the ground at 53 with a portion of the resistance 10 in series therewith. When the master controller occupies the position c, another circuit is established from the terminal 91 of the transformer winding 61, in the usual manner, to the master switch 45, from whence it traverses train conductor 49, conducting segment 102 of the change-over switch, magnet winding 31 of the switch 19 and by way of the overload relay switch 40 to ground. Energizing of the magnet winding 31 causes the switch 19 to close and the motor circuits are then established from a point 103 in the transformer winding 13, through switches 20 and 19, magnet winding 69 of the overload relay switch 40 and then through the switches 23, 24 and 21, the motors and the reversing switch in exactly the same manner as was described when the master switch occupies the position a. The motors are then supplied with energy at a potential equal to that existing between the point 103 in the transformer winding 13 and the track rail 53. When the master switch is moved to the position d, a circuit is established, in the usual manner, from the terminal 91 of the transformer winding 61, to the master switch 45, from whence it traverses the train conductor 50, conducting segment 104 of the change-over switch, magnet winding 29 of the switch 17, interlocking switch 80 and by way of the overload relay switch 40 to ground. Energizing of the magnet winding 29 causes closure of the switch 17, which, in turn, operates the interlocking switch 79 so as to interrupt the circuit of the magnet winding 32 and thereby permit switch 20 to open. The motor circuit is then established through the switches 14 and 17, a portion of the resistance 10, switch 19, magnet winding 69 of the overload relay switch 40 and switches 23, 24 and 21, the motors and the reversing switch, in the manner which has been before described, the full potential of the transformer winding 13, reduced by the drop of potential in the portion of the resistance 10 between the switches 17 and 19, being then applied to the motor circuit. When the master switch is moved to the position e, a circuit is established, in the usual manner, through it, the train conductor 51, conducting segment 105, magnet winding 30 of the switch 18 and by way of the overload relay switch 40 to ground. Energizing of the magnet winding 30 causes the switch 18 to close and also operates the interlocking switch 80, whereby the circuit of the magnet winding 29 is interrupted and the switch 17 is permitted to open. The motor circuits are then established through switches 14, 18 and 19, operating magnet winding 69, switches 23, 24 and 21, the motors and the reversing switch, in the manner which has been hereinbefore described. When the master switch occupies this last position, the full potential is applied to the motor circuits with no resistance included therein.

If high voltage alternating current is supplied to the system, a specially constructed trolley collector 106 may be, and usually will be, employed instead of the one which is employed when direct current and low voltage alternating current are supplied to the system, the trolley collector 106 being connected to one terminal of the primary winding 12 of the main transformer, the other terminal of which is connected directly to the track rail 53. The transformer 11 will ordinarily be so designed that the voltage which is induced in the winding 13 will be approximately that which is supplied to it when the system is operating on low voltage alternating current. The switch 43 will be moved to the position shown in broken lines when high voltage alternating current is supplied to the system, in order to connect the auxiliary transformer 41 and the auxiliary resistance 42 in shunt to the secondary winding 13, so that when the secondary winding 13 is energized, the transformer 41 will be supplied with energy therefrom. This enables the change-over switch to be operated automatically and the remaining switches of the system to be operated whenever high voltage alternating current is supplied to the system. As here shown, the switch 43 also serves to disconnect the motors from the track rail 53 when supplied with high voltage alternating current, this being done in order to provide a completely insulated motor circuit, but it is to be understood that this may or may not be done, as desired. The operation of the remainder of the system, when high voltage alternating current is supplied thereto, remains exactly the same as described when low voltage alternating current is supplied to the system, and further description of the operation on high voltage alternating current is therefore deemed unnecessary.

It is to be observed that the circuits of all of the magnet windings 26 to 37, inclusive, traverse the overload relay switch 40, and it will therefore be readily understood that when the amount of current traversing the magnet winding 69 exceeds a predetermined amount—that is, when the current supplied to the motors exceeds a predetermined amount—and the switch 40 opens and interrupts the circuits of the magnet windings 26 to 37, inclusive, the corresponding switches 14 to 25, inclusive, open and interrupt the motor circuits. Upon opening of the switch 40, the interlocking switch 71 closes, thereby establishing a circuit through the retaining magnet winding 70, which holds the overload relay switch 40 in its open position until the circuit of the winding 70 is interrupted by returning of the master switch 45ª to its "off" position. The operation of this switch will be understood upon tracing the circuit from the terminal 91 of the transformer 62, through the master switches 45ª and 44ª, interlocking switch 67, the magnet winding 70 and the interlocking switch 71.

If, when operating by direct current, it becomes desirable to remove one or the other of the pairs of motors from the circuit because of injury thereto, or for any other reason, the corresponding switch 44 or 45 should be moved to the position shown in broken lines. If, when the master switch 45ª occupies the position a, the switch 44 is moved to the position shown in broken lines, the circuits of the magnet windings 34 and 36 of the switches 22 and 24 will be interrupted, thereby rendering operation of the switches impossible, and a circuit which is established in the usual manner as far as the conducting segment 77 will then be continued through blade 81 of the switch 44 in its broken line position, blade 95 of the switch 45, operating magnet winding 35 of the switch 23, interlocking switch 94 and by way of the overload relay switch 40 to the ground. The switch 23 closes because of the energizing of the magnet winding 35 and a circuit is established from the trolley conductor 56, through switch 15, resistance 10, magnet winding 69 of the overload relay switch 40, switch 23, conducting segment 87 and the reversing switch, field magnet windings 7 and 8, conducting segment 88 of the reversing switch, armatures 3 and 4, by way of the usual circuit, to ground, it being observed that the armatures 1 and 2 and the field magnet windings 5 and 6 are removed from the circuit, as will be best understood by referring to Fig. 2. Similarly, if the switch 45 is moved to the position shown in broken lines, a circuit will be established as far as the conducting segment 77 in the usual manner, then through blade 107 of the cut-out switch 45, in the position shown in broken lines, magnet winding 33 of the switch 21 and interlocking switch 94, by way of the overload relay switch 40, to ground. The switch 21 will then close, thereby short-circuiting the motor armatures 3 and 4 and their field magnet windings 7 and 8 by connecting both terminals to the ground, as may be best understood from a consideration of Fig. 2.

If, when operating by alternating current, the switch 44 is moved to the position shown in broken lines, the circuit of the magnet winding 36 will be interrupted and the switch 24 will be permitted to open, thereby opening the circuit through the motor armatures 1 and 2 and field magnet windings 5 and 6. If the switch 45 is moved to the position shown in broken lines, the circuit of the magnet winding 35 will be interrupted and the switch 23 will be permitted to open, and the circuit of the motor armatures 3 and 4 and the field magnet windings 7 and 8 will be interrupted.

It should be pointed out that when the system here shown is employed for the simultaneous control of several cars of a train, the positions of the change-over switches on each of the cars will correspond to the character of energy that is supplied to the respective cars, since the means for controlling their positions are independent of the train conductors. It is therefore impossible for direct current to be supplied to the motors when their circuits are arranged for operation by alternating current and vice versa.

Many of the devices are here illustrated in a conventional manner and are intended to be indicative only of suitable devices which may be employed for the purpose described. The various magnet windings may operate directly the switches to which they pertain or they may serve only to control other suitable operating means therefor, such as fluid-pressure-actuated devices. When employed for the latter purpose, it will be understood that only small amounts of energy will traverse the control circuits and consequently the auxiliary transformer and the auxiliary resistance and many of the other devices may be very small as compared with the devices which are located directly in the motor circuits. It will, of course, be understood that an auto-transformer may be employed instead of a two winding transformer from which to supply the motors and many other modifications in the circuits of the system may be made without departing from the spirit of the invention.

In other applications, Serial Nos. 292,235 and 292,236, respectively, filed by me of even date herewith, are shown and described change-over switches that serve to arrange the circuit relations of the motors directly according to the character of the energy that is supplied thereto, the unit or individually actuated switches serving only to govern the amount of the resistance or the active length of the transformer winding that is included in circuit. It has been seen that, according to my present invention, the unit switches govern both the circuit relations of the motors and the amount of the resistance or the active length of the transformer winding that is included in circuit, the change-over switch merely governing the sequence in which the unit switches shall operate in order to adjust the circuit relations of the motors in accordance with the character of energy that is supplied thereto. Also, in the other applications, the change-over switches are maintained normally in central positions and are operated in the one direction or the other, according to the character of the energy supplied, while in the present application the change-over switch arranges the circuits normally for direct current operation and is moved automatically so as to arrange the circuits of the motors for operation by alternating current when alternating current is supplied to the system.

I claim as my invention:

1. The combination with a source of alternating current, a source of direct current, translating devices and means for adjusting the circuit relations thereof in accordance with the character of energy that may be supplied thereto, of means for preventing a supply of energy to the translating devices until the circuit connections thereof correspond to the character of the energy to be supplied thereto.

2. The combination with a source of direct current, a source of alternating current and translating devices, of means for arranging the circuits of the translating devices for operation by either direct or alternating current but normally for direct current operation, a resistance, a transformer, and means supplied by the transformer for causing the aforesaid means to arrange the circuits of the translating devices for operation by alternating current.

3. The combination with a source of alternating current, a source of direct current, translating devices and a reversing switch, of means for arranging the circuits of the translating devices for operation by either alternating or direct current but normally for direct current operation, a resistance, a transformer, means supplied with current by the transformer for causing the aforesaid means to arrange the circuits for alternating current operation, and means supplied with current from the transformer or from the resistance, according as alternating or direct current is being utilized, for causing operation of the reversing switch.

4. The combination with a source of alternating current, a source of direct current, translating devices, a reversing switch and means for arranging circuits of the translating devices for operation by either alternating or direct current, of a resistance, a transformer, and means for operating the reversing switch that is supplied with current from the circuits of the resistances or of the transformer according as alternating or direct current is being utilized.

5. The combination with a source of alternating current, a source of direct current and translating devices, of a switch that is normally maintained in position for arranging the circuits for operation of the translating devices by direct current and means for moving the switch automatically to arrange the circuits for operation of the translating devices by alternating current when alternating current becomes available.

6. The combination with a source of alternating current, a source of direct current and translating devices, of a change-over switch that is normally maintained in position for arranging the circuits for operation of the translating devices by direct current, means for moving the switch automatically to arrange the circuits for operation of the translating devices by alternating current when alternating current is available and a reversing switch that may be caused to operate by either character of energy only after the setting of the change-over switch.

7. The combination with a source of alternating current, a source of direct current and translating devices, of a change-over switch that is normally maintained in position for arranging the circuits for operation of the translating devices by direct current, means for moving the switch automatically to arrange the circuits for operation of the devices by alternating current when alternating current becomes available and a reversing switch that may be caused to operate by either character of energy.

8. The combination with a source of alternating current, a source of direct current and translating devices, of a switch that is normally maintained in position for arranging the circuits for operation of the translating devices by direct current, means for moving the switch automatically to arrange the circuits for operation of the devices by alternating current when alternating current becomes available, a reversing switch and governing means therefor that may be energized by either character of energy but only subsequent to the setting of the change-over switch.

9. The combination with distributing conductors, a source of alternating current, a source of direct current and translating devices, of a resistance, a transformer, a reversing switch, a change-over switch that is normally maintained in position to arrange the circuits for operation of the translating devices by direct current, means for automatically causing movement of the change-over switch to arrange the circuits for operation of the devices by alternating current when alternating current is available and governing means for the reversing switch, the governing means for both of said switches being supplied with operative amounts of energy from the transformer when alternating current is supplied to the distributing conductors, and the reversing switch controlling means being supplied also with operative amounts of direct current from a circuit in shunt to the resistance when direct current is supplied to the distributing conductors.

10. The combination with distributing conductors, a source of alternating current, a source of direct current and translating devices, of a transformer, a resistance, switches for arranging the circuit relations and connections of the translating devices and controlling magnet windings for the switches that are supplied from the transformer when alternating current is supplied to the distributing conductors and that are supplied from a shunt circuit to the resistance when direct current is supplied to the distributing conductors.

11. The combination with distributing conductors, a source of alternating current, a source of direct current and translating devices, of a transformer, a resistance, switches for arranging the circuit relations and connections of the translating devices, a reversing switch and controlling magnet windings for all of said switches that are supplied from the transformer when alternating current is supplied to the distributing conductors and that are supplied from a shunt circuit to the resistance when direct current is supplied to the distributing conductors.

12. The combination with a source of alternating current, a source of direct current, translating devices that may be operated by either character of energy and switches for arranging the circuit relations and connections thereof, of means for causing operation of the switches in a predetermined order when the devices are operated by alternating current and for causing operation thereof in another predetermined order when the devices are operated by direct current.

13. The combination with a source of alternating current, a source of direct current, translating devices that may be operated by either character of energy, switches for arranging the circuit relations and connections thereof and controlling magnet windings for the switches, of means which provide for energizing of the switch magnet windings in a predetermined order when the devices are operated by alternating current and for energizing thereof in another predetermined order when the devices are operated by direct current 14. The combination with a source of alternating current, a source of direct current, translating devices that may be operated by either character of energy, switches for arranging the circuit relations and connections thereof and controlling magnet windings for the switches, of automatically operated means which provide for energizing of the switch magnet windings in a predetermined order when the devices are operated by alternating current and for energizing thereof in another predetermined order when the devices are operated by direct current.

15. The combination with a source of alternating current, a source of direct current, translating devices that may be operated by either character of energy, switches for arranging the circuit relations and connections thereof and controlling magnet windings for the switches, of a change-over switch located in the circuits of the controlling magnet windings which provides for closure of the switches in a predetermined order when the devices are operated by alternating current and in another predetermined order when the devices are operated by direct current and which normally maintains the latter conditions, and means for causing the change-over switch to automatically establish the former conditions when alternating current is supplied to the system.

16. The combination with a source of alternating current, a source of direct current, translating devices that may be operated by either character of energy, switches for arranging the circuit relations and connections thereof and controlling magnet windings for the switches, of means which provide for energizing the switch magnet windings in a predetermined order when the devices are operated by alternating current and for energizing them in another predetermined order when the devices are operated by direct current, a reversing switch and means for preventing operation thereof until after operation of the aforesaid means.

17. The combination with a source of alternating current, a source of direct current, translating devices that may be operated by either character of energy, switches for arranging the circuit relations and connections thereof and controlling magnet windings for the switches, of a change-over switch that is operated in accordance with the character of the energy that may be supplied to the devices and that arranges the circuits of the switch magnet windings so as to provide for closure of the switches in a predetermined order when the devices are operated by alternating current and in another predetermined order when the devices are operated by direct current, a reversing switch and means for preventing operation thereof until after operation of the change-over switch.

18. The combination with a source of alternating current, a source of direct current, translating devices that may be operated by either character of energy, switches for arranging the circuit relations and connections thereof and controlling magnet windings for the switches, of a change-over switch that is operated in accordance with the character of the energy to be supplied to the devices and that arranges the circuits of the switch magnet windings so as to provide for closure of the switches in a predetermined order when the devices are operated by alternating current and in another predetermined order when the devices are operated by direct current, a reversing switch, means for preventing operation thereof until after operation of the change-over switch and means for preventing operation of the circuit-arranging switches until after operation of the reversing switch.

19. The combination with a translating device that may be operated on either alternating or direct current, and a plurality of switches, of means for causing the switches to adjust the circuit relations of the translating device for operation alternately on direct and alternating current.

20. The combination with a translating device that may be operated on either alternating or direct current, and a plurality of switches, of a master controller for governing the operation of said switches, and means interposed between the master controller and the said switches for causing the switches to operate in accordance with the character of energy that is supplied to the translating device.

21. The combination with a translating device that may be operated on either alternating or direct current, and a plurality of switches, of a master controller for governing the operation of said switches, and automatically-operated means interposed between the master controller and the said switches for causing the switches to operate in accordance with the character of energy that is supplied to the translating device.

22. In a system of control, a translating device, a main controller having separate alternating current and direct current governing means for said device, and a master controller for said main controller.

23. In a system of control, a translating device, a controlling device for alternating current operation, a controlling device for direct current operation, and a master controller for governing both of said controlling devices.

24. In a system of control, a motor, a motor controlling device for alternating current operation, a motor controlling device for direct current operation, and a master controller for governing the action of both of said controlling devices.

25. In a system of control, a motor, a speed-controlling device for use on alternating current, a second speed controlling device for use on direct current, switch devices for governing said controlling devices, and a master controller for governing said switch devices.

26. In a system of control, a translating device, a transformer, a resistance, switch devices for connecting said translating device to the transformer for alternating current operation, switch devices for connecting the translating device to a source of supply with said resistance in circuit for operating on direct currents, and a master controller for governing the operation of the said switch devices.

27. In a system of control, a translating device, a transformer, a resistance, switch devices for connecting said translating device to variable points on the transformer for operation on alternating current, switch devices for connecting said translating device to a source of current with variable portions of said resistance in circuit for operation on direct current, and a master controller for governing said switch devices.

28. In a system of motor control, a motor, a transformer, a resistance, a motor controller of the separately actuated contact type having contacts for connecting the motor to variable taps on the transformer and other contacts for connecting the motor to a source of supply with variable portions of the resistance in circuit, and a master controller for governing the action of all of said contacts.

29. In a control system, a controller of the separately actuated contact type having a set of alternating current contacts and a set of direct current contacts, a master controller, and means for causing said master controller to operate selectively on said sets of contacts so as to cause a contact in one set or the other to be actuated when the master controller is in a given position, according as the current is alternating or direct.

30. In a train control system, a plurality of motor controllers, each having alternating current and direct current contacts, a master controller, and a single set of train wires connecting said master controller to all of said motor controllers.

31. In a system of control, a translating device, a transformer, a resistance, and a controller arranged to connect said translating device to variable points on the transformer when operating on alternating current and to a source of current with variable portions of said resistance in circuit for operation on direct current, said controller including means for connecting portions of said resistance in a branch circuit between the translating device and one tap on the transformer before connection is broken between the translating device and another tap on the transformer.

32. In a system of control, a motor, a plurality of contacts for controlling the operation of the motor on direct current, a plurality of contacts arranged to operate only on alternating current, actuating means for said contacts, a master controller, and a single set of connections between the master controller and the actuating means for said contacts.

33. In a system of control, a motor, a set of contacts for controlling the operation of the motor on alternating current, a second set of contacts for controlling the operation of the motor on direct current, actuating means for said contacts, a master controller, a single set of connections from said master controller to the actuating means of both contacts, a relay for governing the circuits of the actuating means for one set of contacts, and means controlled by the latter contacts for controlling the actuating circuits for the other contacts.

34. In a system of control, a translating device, a transformer, a resistance, switches arranged to connect said translating device to different taps on the transformer, a resistance controlling switch, a master controller and connections so arranged that upon the operation of the master controller from one position to the next the translating device is first connected to one tap on the transformer and then to a second tap through said resistance and the connection to the first tap is then interrupted and the resistance cut out.

35. In a system of control, a motor, a transformer, a resistance, a series of switches for connecting the motor to different points on the transformer for operation on alternating current, a second series of switches for varying the amount of said resistance in the motor circuit when operating on direct current, a master controller, and connections so arranged that upon the operation of the master controller from one running position to another the motor is first connected to one tap on the transformer, a resistance controlling switch is operated to connect the motor to a second tap on the transformer through a portion of the resistance and finally the connection to the first tap is interrupted and the resistance eliminated from the motor circuit.

In testimony whereof, I have hereunto subscribed my name this 15th day of December, 1905.

RAY P. JACKSON.

Witnesses:
OTTO S. SCHAIRER,
BIRNEY HINES.